(12) United States Patent (10) Patent No.: US 10,595,279 B2
Tang et al. (45) Date of Patent: Mar. 17, 2020

(54) POWER CONTROL METHOD AND DEVICE

(71) Applicant: HUAWEI TECHNOLOGIES CO., LTD., Shenzhen, Guangdong (CN)

(72) Inventors: Hao Tang, Shanghai (CN); Xiaojun Ma, Shanghai (CN); Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/151,971

(22) Filed: Oct. 4, 2018

(65) Prior Publication Data

US 2019/0037502 A1    Jan. 31, 2019

Related U.S. Application Data

(63) Continuation of application No. PCT/CN2017/077528, filed on Mar. 21, 2017.

(30) Foreign Application Priority Data

Apr. 6, 2016  (CN) .......................... 2016 1 0209180

(51) Int. Cl.
*H04B 7/00* (2006.01)
*H04W 52/14* (2009.01)
(Continued)

(52) U.S. Cl.
CPC ............. *H04W 52/146* (2013.01); *H04L 5/14* (2013.01); *H04W 52/24* (2013.01);
(Continued)

(58) Field of Classification Search
CPC ............. H04W 52/146; H04W 52/325; H04W 52/243; H04W 52/24; H04W 52/286; H04W 52/36; H04L 5/14
See application file for complete search history.

(56) References Cited

U.S. PATENT DOCUMENTS

2009/0092066 A1    4/2009 Chindapol et al.
2013/0051259 A1*   2/2013 Kim ........................ H04L 5/001
                                                        370/252
(Continued)

FOREIGN PATENT DOCUMENTS

CN    101940008 A    1/2011
CN    103096448 A    5/2013
(Continued)

OTHER PUBLICATIONS

Intel Corporation, "Discussion on Remaining Details of UL PC for eIMTA Support", 3GPP TSG RAN WG1 Meeting #75 R1-135098, San Francisco, USA, Nov. 11-15, 2013, total 5 pages.

(Continued)

*Primary Examiner* — Nhan T Le
(74) *Attorney, Agent, or Firm* — Fish & Richardson P.C.

(57) ABSTRACT

The present invention relates to the field of wireless communications, and in particular, to a transmit power control technology in a wireless communications system. In a transmit power control method, user equipment performs transmit power compensation on subframes in different subframe sets by using different power compensation amounts, and sends data in the subframes by using uplink transmit powers on which the transmit power compensation has been performed. According to the solution provided in this application, smoothness of a signal-to-noise ratio of each uplink subframe can be ensured when a full-duplex technology is applied, and reception performance of the uplink subframe can further be ensured without causing excessively large signaling overheads.

10 Claims, 5 Drawing Sheets

(51) Int. Cl.
*H04W 52/24* (2009.01)
*H04W 52/36* (2009.01)
*H04L 5/14* (2006.01)
*H04W 52/28* (2009.01)
*H04W 52/32* (2009.01)

(52) U.S. Cl.
CPC ......... *H04W 52/243* (2013.01); *H04W 52/36* (2013.01); *H04W 52/286* (2013.01); *H04W 52/325* (2013.01)

(56) References Cited

U.S. PATENT DOCUMENTS

| | | | |
|---|---|---|---|
| 2013/0103822 A1* | 4/2013 | Wolcott | ............... H04L 41/12 709/224 |
| 2015/0133179 A1* | 5/2015 | Li | ................. H04W 52/146 455/522 |
| 2016/0212743 A1 | 7/2016 | Sun et al. | |
| 2018/0146438 A1* | 5/2018 | Yi | ................... H04L 1/1812 |
| 2018/0249419 A1 | 8/2018 | Zhang et al. | |

FOREIGN PATENT DOCUMENTS

| | | |
|---|---|---|
| CN | 103096449 A | 5/2013 |
| CN | 104105188 A | 10/2014 |
| CN | 104333899 A | 2/2015 |
| CN | 104519579 A | 4/2015 |
| EP | 2770785 B1 | 6/2016 |
| EP | 3051735 A2 | 8/2016 |
| WO | 2015044779 A2 | 4/2015 |
| WO | 2015094914 A1 | 6/2015 |

OTHER PUBLICATIONS

Extended European Search Report issued in European Application No. 17778584 dated Feb. 13, 2019, 9 pages.

International Search Report and Written Opinion issued in International Application No. PCT/CN2017/077528 dated Jun. 19, 2017, 17 pages.

Office Action issued in Chinese Application No. 201610209180.3 dated Nov. 20, 2019, 7 pages.

Search Report issued in Chinese Application No. 201610209180.3 dated Nov. 12, 2019, 3 pages.

\* cited by examiner

POWER CONTROL METHOD AND DEVICE

CROSS-REFERENCE TO RELATED APPLICATIONS

This application is a continuation of International Application No. PCT/CN2017/077528, filed on Mar. 21, 2017, which claims priority to Chinese Patent Application No. 201610209180.3, filed on Apr. 6, 2016, The disclosures of the aforementioned applications are hereby incorporated by reference in their entireties.

TECHNICAL FIELD

The present invention relates to the field of wireless communications, and in particular, to a transmit power control technology in a wireless communications system.

BACKGROUND

A frequency division duplex (FDD) manner or a time division duplex (TDD) manner is usually used in an existing wireless communications network to avoid interference between a transmitter and a receiver. In a full-duplex technology, signal transmission and signal reception are simultaneously performed in a same frequency band. Full-duplex application in wireless transmission is a recent research focus. Introduction of the full-duplex technology to a cellular system may bring advantages such as increasing frequency spectrum efficiency and improving resource scheduling flexibility. When the full-duplex technology is applied to the wireless communications network, a self-interference problem of a full-duplex device needs to be resolved. Due to simultaneous transmission and reception in a same frequency, great interference is caused by a transmit signal of a full-duplex transceiver on a receive signal. A self-interference cancellation device is difficult to implement due to high complexity. In a common full-duplex system, a network device is a full-duplex device, and user equipment (UE) is a conventional half-duplex device.

When the full-duplex technology is applied to the existing wireless communications network, for example, in an Long Term Evolution (LTE)/Long Term Evolution-Advanced (LTE-A) network, different TDD UEs use different subframe configuration manners. Therefore, a network device may perform only uplink reception in some subframes, but needs to simultaneously perform uplink reception and downlink transmission in other subframes. For a power control policy, the foregoing cases are usually not distinguished in the prior art. Same power control may be performed on a full-duplex subframe and another subframe. In this case, a received signal-to-noise ratio of the network device is lower than an expected received signal-to-noise ratio due to the self-interference problem of the full-duplex subframe. Alternatively, the network device may configure another group of power control parameters, different from those of another subframe, for the full-duplex subframe, to perform separate subframe-level power control. When a quantity of UEs increases, a quantity of subframes using separate power control parameters also increases. Consequently, signaling overheads are greatly increased, and network performance is affected. Therefore, a power control method is needed to perform power control on UE, to ensure smoothness of a signal-to-noise ratio of each uplink subframe when a full-duplex technology is applied, and further ensure reception performance of the uplink subframe without causing a notable increase of signaling overheads.

SUMMARY

This specification describes a transmit power control method, an apparatus, and a system, to ensure smoothness of a signal-to-noise ratio of each uplink subframe when a full-duplex technology is applied, and further ensure reception performance of the uplink subframe without causing a notable increase of signaling overheads.

According to an aspect, an embodiment of this application provides a transmit power control method. The method includes: performing, by user equipment, transmit power compensation on a subframe in a first subframe set by using a first cell-level power compensation amount; and sending, by the user equipment, data in the subframe by using an uplink transmit power on which the transmit power compensation has been performed. Subframes in a system are classified into different sets, and transmit power compensation is differently performed on subframes in different subframe sets. A transmit power of a subframe may be more flexibly adjusted according to a specific status of the subframe, so that different types of subframes can meet a requirement of a received signal-to-noise ratio, and there is no need to perform separate power control on different types of subframes. It may be understood that the first cell-level power compensation amount may be agreed on in advance by a network device and the user equipment, or may be delivered by the network device to the user equipment by using a cell-level parameter. Transmit power compensation is performed on a subframe of a first subframe set of all UEs in a cell by using a cell-level power compensation value. Power control may be simplified and a transmit power of the subframe of the first subframe set is increased. Particularly, when the first power compensation amount is delivered by using the parameter, signaling overheads may be significantly reduced by using the first cell-level power compensation amount.

In a possible design, before the user equipment performs transmit power compensation on the subframe in the first subframe set by using the first cell-level power compensation amount, the UE receives a cell-level message that is sent by the network device and that includes the first power compensation amount information. Optionally, the cell-level message is a system information block (SIB). The first power compensation amount is configured by using the cell-level parameter, the network device delivers the first power compensation amount to all the UEs in the cell by using the SIB, and a quantity of signaling does not increase when a quantity of UEs in the cell increases, so that the transmit power of the subframe in the first subframe set may be increased, and uplink subframe received quality may be ensured without causing excessively large signaling overheads.

In a possible design, the user equipment performs transmit power compensation on a subframe in a second subframe set by using a second cell-level power compensation amount. The first power compensation amount is greater than the second power compensation amount. The UE may perform transmit power compensation on the subframe in the second subframe set according to a specific situation, to ensure uplink received quality of the subframe in the second subframe set. When the first power compensation amount is greater than the second power compensation amount, transmit power compensation may be performed on the subframe in the first subframe set by using a larger power compensation amount, to ensure smoothness of uplink received signal-to-noise ratios of subframes in different subframe sets.

In a possible design, the first subframe set is a full-duplex subframe set, and the second subframe set is a non-full-duplex subframe set, where a subframe in the full-duplex subframe set is a subframe in which the network device receives data in this type of subframe and simultaneously sends downlink data in a same frequency band of the subframe, and a subframe in the non-full-duplex subframe set is a subframe in which the network device receives data in this type of subframe and does not simultaneously send downlink data in a same frequency band of the subframe. Because the subframe in the full-duplex subframe set is interfered by a downlink transmit signal of the network device, uplink received noise of the network device increases. If the UE calculates a transmit power by using a power control method that is the same as a power control method for the subframe in the non-full-duplex subframe set and performs transmission, a received signal-to-noise ratio of the network device is lower than an expected received signal-to-noise ratio. The first power compensation amount and the second power compensation amount are differently set, so that the UE may increase a transmit power for the subframe in the full-duplex subframe set, to ensure that the received signal-to-noise ratio of the network device meets the expected received signal-to-noise ratio, ensure smoothness of a signal-to-noise ratio of each uplink subframe when a full-duplex technology is applied, and further ensure reception performance of the uplink subframe. It may be understood that the first subframe set and the second subframe set may be obtained in another division manner according to a specific situation, and are not limited to a division manner of the full-duplex subframe set and the non-full-duplex subframe set. This is not limited in this application.

In a possible design, the second power compensation amount is zero. To be specific, no power compensation may be performed on a transmit power of the subframe in the second subframe set, and an uplink transmit power may be directly calculated according to a power control method configured by the network device. In this case, the cell-level message may include the first power compensation amount information and second power compensation amount information, or may include only the first power compensation amount information to simplify the cell-level message and reduce signaling overheads. The power control method configured by the network device may vary according to different communications systems. For example, in an LTE system, power control may be performed with reference to the uplink power control method specified in 3rd Generation Partnership Project, (3GPP) TS 36.213.

In a possible design, the cell-level message includes the first power compensation amount information and the second power compensation amount information. The cell-level message includes the first power compensation amount information and the second power compensation amount information, so that the second power compensation amount may be more flexibly configured, and a quantity of signaling does not increase when a quantity of UEs of a cell increases. When the first power compensation amount is greater than the second power compensation amount, the transmit power of the subframe in the first subframe set is increased, and uplink subframe received quality is ensured without causing excessively large signaling overheads.

In a possible design, the cell-level message includes one piece of first power compensation amount information, and the one piece of first power compensation amount information indicates at least one of a first power compensation amount of a transmit power of a physical uplink shared channel, a first power compensation amount of a transmit power of a physical uplink control channel, and a first power compensation amount of a transmit power of a sounding reference signal. The physical uplink shared channel is mainly used to carry application data, or may carry content such as uplink control information and radio resource control signaling, and may be, for example, a physical uplink shared channel (PUSCH) and another uplink channel that is defined as a network evolves and that has the foregoing function. The physical uplink control channel is mainly used to carry uplink control information, and may be, for example, a physical uplink control channel (PUCCH) and another uplink channel that is defined as a network evolves and that has the foregoing function. The sounding reference signal is used to estimate or measure uplink channel quality, and may be, for example, an sounding reference signal (SRS) and another reference signal that is defined as a network evolves and that has the foregoing function. The first power compensation amount of the uplink transmit power may be applied to uplink physical channels such as the physical uplink shared channel, the physical uplink control channel, and the sounding reference signal, to increase the uplink transmit power of the subframe in the first subframe set, to ensure smoothness of a signal-to-noise ratio of an uplink subframe on the channel and further ensure uplink subframe received quality. A first power compensation amount of one or more of the foregoing physical channels may be indicated by using one piece of first power compensation amount information in the cell-level message. A same first power compensation amount may be used for different uplink physical channels, so that not only uplink subframe received quality on different uplink physical channels can be ensured, but also a quantity of bits of the cell-level message can be reduced.

In another possible design, the cell-level message includes three pieces of first power compensation amount information, and the three pieces of first power compensation amount information respectively indicate a first power compensation amount of a transmit power of a physical uplink shared channel, a first power compensation amount of a transmit power of a physical uplink control channel, and a first power compensation amount of a transmit power of a sounding reference signal. The physical uplink shared channel is mainly used to carry application data, or may carry content such as uplink control information and radio resource control signaling, and may be, for example, a physical uplink shared channel (PUSCH) and another uplink channel that is defined as a network evolves and that has the foregoing function. The physical uplink control channel is mainly used to carry uplink control information, and may be, for example, a physical uplink control channel (PUCCH) and another uplink channel that is defined as a network evolves and that has the foregoing function. The sounding reference signal is used to estimate or measure uplink channel quality, and may be, for example, an sounding reference signal (SRS) and another reference signal that is defined as a network evolves and that has the foregoing function. The cell-level message includes three pieces of first power compensation amount information, and different first power compensation amounts may be used for different uplink physical channels, to more flexibly ensure uplink subframe received quality on different uplink physical channels.

According to another aspect, an embodiment of this application provides a transmit power control method. The method includes: receiving, by a network device, data sent in a subframe in a first subframe set after user equipment performs transmit power compensation on the subframe by using a first cell-level power compensation amount.

In a possible design, before the receiving, by a network device, data sent in a subframe in a first subframe set after user equipment performs transmit power compensation on the subframe by using a first cell-level power compensation amount, the method further includes: sending, by the network device to the user equipment, a cell-level message including the first power compensation amount information. Optionally, the cell-level message is a system information block (SIB).

In a possible design, the network device selects the first power compensation amount from a power compensation amount set. The power compensation amount set is a set including one or more power compensation amounts. The power compensation amount set is defined, so that more choices of power compensation amounts may be provided for network devices having different self-interference cancellation capabilities, different power compensation amounts may be selected by the network device for different physical channels or in different interference scenarios, and a cell-level message used for sending power compensation amount information may be simplified.

In a possible design, the network device may select the power compensation amount from the power compensation amount set based on a self-interference cancellation capability of the network device.

In another possible design, the network device may randomly select the power compensation amount from the power compensation amount set.

In a possible design, the network device receives data sent in a subframe in a second subframe set after the user equipment performs transmit power compensation on the subframe by using a second cell-level power compensation amount. The first power compensation amount is greater than the second power compensation amount.

In a possible design, the first subframe set is a full-duplex subframe set, and the second subframe set is a non-full-duplex subframe set, where a subframe in the full-duplex subframe set is a subframe in which the network device receives data in this type of subframe and simultaneously sends downlink data in a same frequency band of the subframe, and a subframe in the non-full-duplex subframe set is a subframe in which the network device receives data in this type of subframe and does not simultaneously send downlink data in a same frequency band of the subframe.

In a possible design, the second power compensation amount is zero. No power compensation may be performed on a transmit power of the subframe in the second subframe set, and an uplink transmit power may be directly calculated according to a power control policy in the prior art. In this case, the cell-level message may include the first power compensation amount information and the second power compensation amount information, or may include only the first power compensation amount information to simplify the cell-level message and reduce signaling overheads.

In a possible design, the cell-level message includes the first power compensation amount information and the second power compensation amount information.

In a possible design, the cell-level message includes one piece of first power compensation amount information, and the one piece of first power compensation amount information indicates at least one of a first power compensation amount of a transmit power of a physical uplink shared channel, a first power compensation amount of a transmit power of a physical uplink control channel, and a first power compensation amount of a transmit power of a sounding reference signal. The physical uplink shared channel is mainly used to carry application data, or may carry content such as uplink control information and radio resource control signaling, and may be, for example, a physical uplink shared channel (PUSCH) and another uplink channel that is defined as a network evolves and that has the foregoing function. The physical uplink control channel is mainly used to carry uplink control information, and may be, for example, a physical uplink control channel (PUCCH) and another uplink channel that is defined as a network evolves and that has the foregoing function. The sounding reference signal is used to estimate or measure uplink channel quality, and may be, for example, an sounding reference signal (SRS) and another reference signal that is defined as a network evolves and that has the foregoing function. A same first power compensation amount may be used for different uplink physical channels, so that not only uplink subframe received quality on different uplink physical channels can be ensured, but also a quantity of bits of the cell-level message can be reduced.

In a possible design, the cell-level message includes three pieces of first power compensation amount information, and the three pieces of first power compensation amount information respectively indicate a first power compensation amount of a transmit power of a physical uplink shared channel, a first power compensation amount of a transmit power of a physical uplink control channel, and a first power compensation amount of a transmit power of a sounding reference signal. The physical uplink shared channel is mainly used to carry application data, or may carry content such as uplink control information and radio resource control signaling, and may be, for example, a physical uplink shared channel (PUSCH) and another uplink channel that is defined as a network evolves and that has the foregoing function. The physical uplink control channel is mainly used to carry uplink control information, and may be, for example, a physical uplink control channel (PUCCH) and another uplink channel that is defined as a network evolves and that has the foregoing function. The sounding reference signal is used to estimate or measure uplink channel quality, and may be, for example, an sounding reference signal (SRS) and another reference signal that is defined as a network evolves and that has the foregoing function. The cell-level message includes three pieces of first power compensation amount information, and different first power compensation amounts may be used for different uplink physical channels, to more flexibly ensure uplink subframe received quality on different uplink physical channels.

With reference to some or all steps in any method of the foregoing two aspects, in some possible designs, when the user equipment calculates a transmit power of an uplink physical channel, a formula is met:

$$P(i) = \min \begin{cases} P_{max,c}(i), \\ P_{ori,c}(i) + \Delta_{FD,c}(i) \end{cases}$$

$$\Delta_{FD,c}(i) = \begin{cases} \text{First power compensation amount}, i \in \text{First subframe set} \\ \text{Second power compensation amount}, i \in \text{Second subframe set} \end{cases} \text{[dBm]},$$

where

P(i) is a transmit power that is of the uplink physical channel in an $i^{th}$ subframe and that is calculated by the user equipment (a transmit power on which the transmit power compensation has been performed), $P_{max,c}(i)$ is a maximum transmit power of the user equipment on the uplink physical channel in the $i^{th}$ subframe of a serving cell c of the user equipment, and $P_{ori,c}(i)$ is a transmit power that is of the uplink physical channel in the $i^{th}$ subframe of the serving cell c of the user equipment and that is calculated by the user equipment according to a power control method configured by the network device. The power control method configured by the network device may vary according to different communications systems. For example, in an LTE system, power control may be performed with reference to the uplink power control method specified in 3GPP TS 36.213. $\Delta_{FD,c}(i)$ is a first power compensation amount or a second power compensation amount when the transmit power of the uplink physical channel is calculated. When the $i^{th}$ subframe belongs to the first subframe set, $\Delta_{FD,c}(i)$ is the first power compensation amount of the uplink physical channel; when the $i^{th}$ subframe belongs to the second subframe set, $\Delta_{FD,c}(i)$ is the second power compensation amount of the uplink physical channel.

With reference to some or all steps in any method of the foregoing two aspects, in some possible designs, the user equipment calculates power headroom by using the uplink transmit power on which transmit power compensation is performed.

According to still another aspect, an embodiment of this application provides user equipment, and the user equipment has a function to implement operations of the user equipment in method embodiment. The function may be implemented by using hardware, or may be implemented by hardware executing corresponding software. The hardware or the software includes one or more modules corresponding to the function.

In a possible design, a structure of the user equipment includes a processor and a transmitter. In a possible design, the user equipment further includes a receiver. The processor is configured to support the user equipment in performing a corresponding function in the foregoing method, the transmitter is configured to support the user equipment in sending information or data in the foregoing method to a network device, and the receiver is configured to support the user equipment in receiving information or data that is sent by the network device and that is in the foregoing method. The user equipment may further include a memory. The memory is configured to couple with the processor, and store a program instruction and data that are necessary for the user equipment.

According to still another aspect, an embodiment of this application provides a network device, and the network device has a function to implement operations of the network device in method embodiment. The function may be implemented by using hardware, or may be implemented by hardware executing corresponding software. The hardware or the software includes one or more modules corresponding to the function.

In a possible design, a structure of the network device includes a receiver. In a possible design, the structure of the network device further includes a transmitter. In a possible design, the structure of the network device further includes a processor. The processor is configured to support the network device in performing a corresponding function in the foregoing method. The transmitter and the receiver are configured to support communication between the network device and user equipment, the transmitter is configured to send information or data in the foregoing method to the user equipment, and the receiver is configured to support the network device in receiving the information or the data that is sent by the user equipment and that is in the foregoing method. The network device may further include a memory. The memory is configured to couple with the processor, and store a program instruction and data that are necessary for the network device. The structure of the network device may further include an interface unit, configured to support communication between the network device and another network device, for example, communication between the network device and a core network node.

According to still another aspect, an embodiment of this application provides a communications system, and the system includes the network device and the user equipment described in the foregoing aspects.

According to yet another aspect, an embodiment of this application provides a computer storage medium, configured to store a computer software instruction used by the foregoing user equipment. The computer storage medium includes a program designed to execute the foregoing aspects.

According to yet another aspect, an embodiment of this application provides a computer storage medium, configured to store a computer software instruction used by the foregoing network device. The computer storage medium includes a program designed to execute the foregoing aspects.

Compared with the prior art, in the solution provided by the application, impact caused by a self-interference problem of a full-duplex network device on reception performance of an uplink subframe is considered. Different power compensation amounts are used for subframes in different subframe sets, to ensure smoothness of a signal-to-noise ratio of each uplink subframe, and further ensure reception performance of the uplink subframe. A power compensation amount is configured by using a cell-level parameter, to ensure the reception performance of the uplink subframe without causing excessively large signaling overheads.

BRIEF DESCRIPTION OF DRAWINGS

Embodiments of this application are described in detail below with reference to the accompanying drawings.

DESCRIPTION OF EMBODIMENTS

Network architectures and service scenarios described in the following embodiments of this application are intended to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application may be further applied to a similar technical problem.

Figure 1:
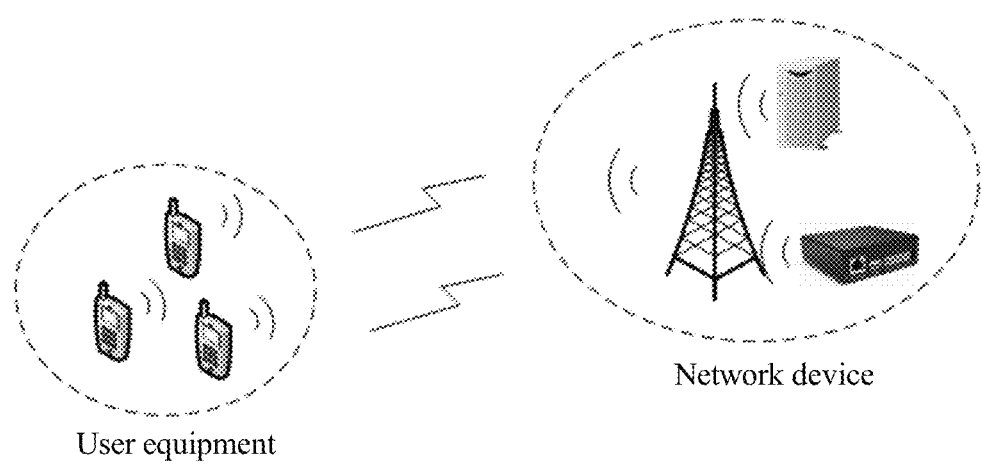
FIG. 1 is a schematic diagram of a possible application scenario of this application.

A technology described in this application is applicable to a Long Term Evolution (LTE) system and a subsequent evolution system such as the 5th generation mobile communication (5G) or other wireless communications systems using various wireless access technologies, such as systems using access technologies such as Code Division Multiple Access, Frequency Division Multiple Access, Time Division Multiple Access, orthogonal frequency division multiple access, and single carrier frequency division multiple access, and particularly applicable to a wireless communications system using a full-duplex technology to perform communication. As shown in FIG. 1, FIG. 1 is a simplified diagram of a network architecture of a communications system according to an embodiment of this application. User equipment (UE) accesses a network device by using a wireless interface to perform communication, or may communicate with other user equipment, for example, communication in a device to device (D2D) scenario or an machine to machine (M2M) scenario. The network device may communicate with the user equipment, or may communicate with another network device, for example, communication between a macro base station and an access point.

In this application, terms "network" and "system" are usually interchangeably used, but meanings of the terms may be understood by a person skilled in the art. The user equipment in this application may include various handheld devices having a wireless communications function, in-vehicle devices, wearable devices, computing devices, control devices, or another processing device connected to a wireless modem, and include various forms such as user equipment (UE), a mobile station (MS), a terminal, and terminal equipment. For ease of description, in this application, all the devices mentioned above are collectively referred to as user equipment or UE. The network device in this application includes a base station (BS), a network controller, a mobile switching center, or the like. An apparatus that directly communicates with the user equipment by using a radio channel is usually a base station. The base station may include various forms such as a macro base station, a micro base station, a relay node, an access point, and a remote radio unit (RRU). Certainly, the apparatus that performs wireless communication with the user equipment may be another network device that has a wireless communication function. This is not uniquely limited in this application. In systems that use different radio access technologies, devices with a base station function may have different names. For example, in an LTE network, the device is referred to as an evolved NodeB (eNB or eNodeB); in a 3rd Generation 3G network, the device is referred to as a NodeB; or the like.

Figure 2:
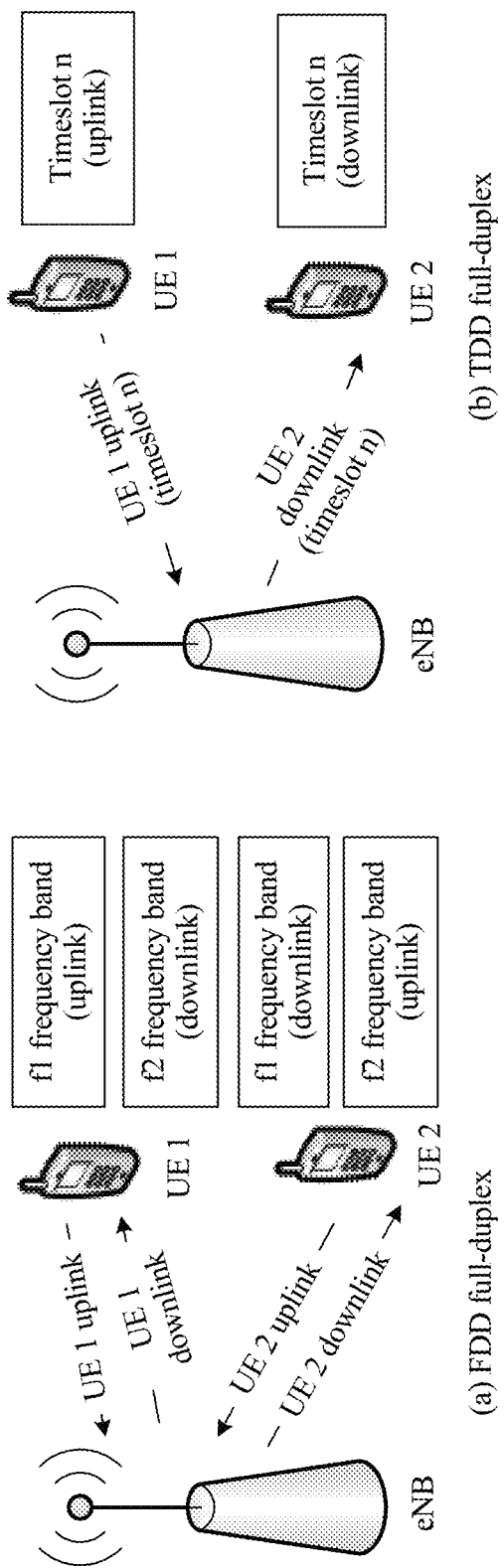
FIG. 2 is a schematic diagram of a full-duplex principle in a possible wireless communications system related to this application.

With reference to FIG. 2, a technical principle of a wireless communications system in which a network device performs communication by using a full-duplex technology is described below by using an LTE network as an example. As shown in FIG. 2(a), the full-duplex technology is applied to a system based on frequency division duplex (FDD). Full-duplex transmission in some subframes may be configured by a higher layer. Some UEs such as UE 1 use a frequency band f1 to perform uplink transmission and use a frequency band f2 to perform downlink transmission. Some UEs such as UE 2 use the frequency band f1 to perform downlink transmission and use the frequency band f2 to perform uplink transmission. An eNB performs simultaneous transmission and reception in frequency bands f1 and f2 (the full-duplex technology is applied). For the eNB, co-channel interference is caused by a downlink transmit signal sent by the eNB to the UE 1 on an uplink transmit signal received by the eNB from the UE 2. Likewise, co-channel interference is caused by a downlink transmit signal sent by the eNB to the UE 2 on an uplink transmit signal received by the eNB from the UE 1. The foregoing two types of interference are a self-interference problem in application of the full-duplex technology. As shown in FIG. 2(b), the full-duplex technology is applied to a system based on time division duplex (TDD). Different subframe configuration manners may be configured for different UEs by a higher layer. In this way, UE performs uplink transmission and UE performs downlink reception in same subframes or timeslots simultaneously. As shown in an example of FIG. 2(b), because UE 1 and UE 2 use different subframe configuration manners, the UE 1 performs uplink transmission and the UE 2 performs downlink reception in a timeslot n. In this case, for an eNB, co-channel interference is caused by a downlink transmit signal sent by the eNB to the UE 2 on an uplink transmit signal received by the eNB from the UE 1, in other words, a self-interference problem in application of the full-duplex technology. It may be understood that, when the eNB does not use the full-duplex technology in some subframes, there is no self-interference when the eNB receives uplink transmission of the UE, and when the eNB uses the full-duplex technology, uplink reception of the eNB is affected by self-interference, in other words, a degree of uplink interference caused when the eNB uses the full-duplex technology is different from a degree of uplink interference caused when the eNB does not use the full-duplex technology.

In the solution provided in the embodiments of this application, an uplink transmit power of UE may be compensated for, depending on whether the full-duplex technology is used in a current subframe, to ensure smoothness of a signal-to-noise ratio of each uplink subframe when the full-duplex technology is applied, and further ensure reception performance of the uplink subframe without causing a notable increase of signaling overheads. The embodiments of this application are further described in detail below based on a common aspect of this application described above.

Figure 3:
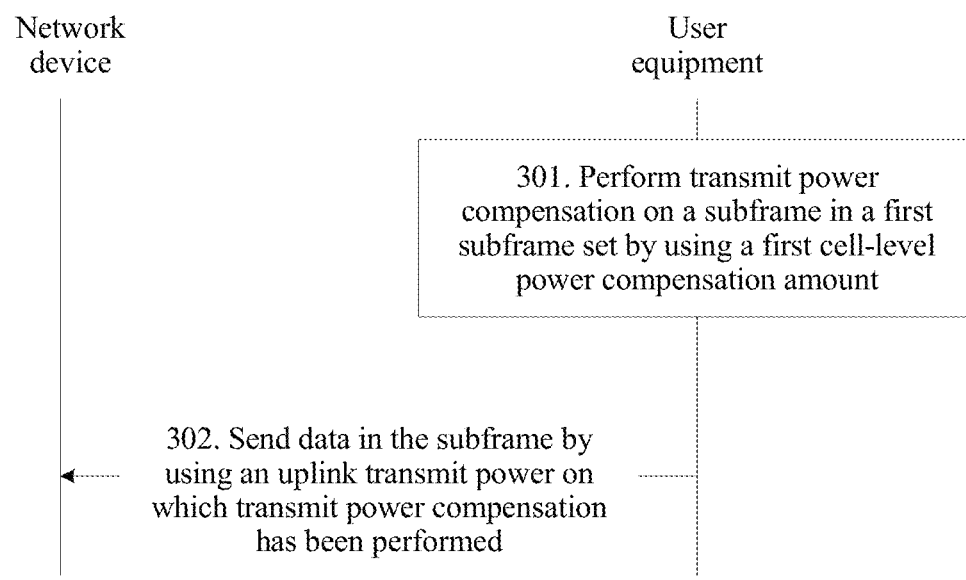
FIG. 3 is a schematic flowchart of a transmit power control method according to an embodiment of this application.

FIG. 3 is a schematic flowchart of a transmit power control method according to an embodiment of this application.

In step 301, user equipment performs transmit power compensation on a subframe in a first subframe set by using a first cell-level power compensation amount. The first subframe set may be obtained by classifying subframes according to a specific requirement in a system, and this is not limited in this application. For example, in an LTE system in which a full-duplex technology is introduced, the first subframe set may be a set of all subframes to which the full-duplex technology is applied. Performing transmit power compensation on the subframe in the first subframe set is compensating with the first power compensation amount when a transmit power of an uplink physical channel on which transmission is performed in the subframe is calculated. Performing transmit power compensation by using the first cell-level power compensation amount is performing transmit power compensation on a corresponding uplink physical channel in the subframe in the first subframe set by all user equipments in a cell by using the same first power compensation amount. It may be understood that, with the development of a wireless communications technology, a minimum unit of time for calculating a transmit power may be reduced to a symbol or a shorter time period. In this case, this embodiment provided in this application can still be applied. For example, when the minimum unit of time for calculating a transmit power is a symbol, the user equipment performs transmit power compensation on a symbol in a first symbol set by using the first cell-level power compensation amount.

In an example, the user equipment obtains the first cell-level power compensation amount. The first power compensation amount may be agreed on in advance by a network device and the user equipment, or may be delivered by the network device to all user equipments in a cell by using a cell-level parameter. For example, the user equipment receives a cell-level message that is sent by the network device and that includes the first power compensation amount information, for example, a system information block (SIB). In a specific example, the SIB includes one piece of first power compensation amount information, and the one piece of first power compensation amount information indicates at least one of a first power compensation amount of a transmit power of a physical uplink shared channel (for example, a PUSCH), a first power compensation amount of a transmit power of a physical uplink control channel (for example, a PUCCH), and a first power compensation amount of a transmit power of a sounding reference signal (for example, an SRS). In another specific example, the SIB includes three pieces of first power compensation amount information, and the three pieces of first power compensation amount information respectively indicate a first power compensation amount of a transmit power of a physical uplink shared channel (for example, a PUSCH), a first power compensation amount of a transmit power of a physical uplink control channel (for example, a PUCCH), and a first power compensation amount of a transmit power of a sounding reference signal (for example, an SRS). It may be understood that the embodiment of the solution provided by this application may further be applied to another uplink physical channel, and is not limited to the channel types mentioned above.

In another example, the user equipment may further perform transmit power compensation on a subframe in a second subframe set by using a second cell-level power compensation amount. The second power compensation amount may be agreed on in advance by the network device and the user equipment, for example, the second power compensation amount is zero; or may be delivered by the network device to all user equipments in a cell by using a cell-level parameter, for example, an SIB includes the second power compensation amount information.

The user equipment may perform transmit power compensation on different uplink physical channels on which transmission is performed in the subframe in the first subframe set, for example, perform transmit power compensation on one or more of the PUSCH, the PUCCH, and the SRS. When the user equipment performs transmit power compensation on a plurality of uplink physical channels, the used first power compensation amount may be the same or different, and the used second power compensation amount may be the same or different.

In an example, when the user equipment calculates a transmit power of an uplink physical channel, a formula is met:

$$P(i) = \min\begin{cases} P_{max,c}(i), \\ P_{ori,c}(i) + \Delta_{FD,c}(i) \end{cases}$$

$$\Delta_{FD,c}(i) = \begin{cases} \text{First power compensation amount, } i \in \text{First subframe set} \\ \text{Second power compensation amount, } i \in \text{Second subframe set} \end{cases} \text{[dBm]},$$

where

P(i) is a transmit power that is of the uplink physical channel in an $i^{th}$ subframe and that is calculated by the user equipment, $P_{max,c}(i)$ is a maximum transmit power of the user equipment on the uplink physical channel in the $i^{th}$ subframe of a serving cell c of the user equipment, and $P_{ori,c}(i)$ is a transmit power that is of the uplink physical channel in the $i^{th}$ subframe of the serving cell c of the user equipment and that is calculated by the user equipment according to a power control method configured by the network device. The power control method configured by the network device may vary according to different communications systems. For example, in an LTE system, power control may be performed with reference to the uplink power control method specified in 3GPP TS 36.213. $\Delta_{FD,c}(i)$ is a first power compensation amount or a second power compensation amount when the transmit power of the uplink physical channel is calculated. When the $i^{th}$ subframe belongs to the first subframe set, $\Delta_{FD,c}(i)$ is the first power compensation amount of the uplink physical channel; when the $i^{th}$ subframe belongs to the second subframe set, $\Delta_{FD,c}(i)$ is the second power compensation amount of the uplink physical channel.

In an example, the first subframe set is a full-duplex subframe set, and the second subframe set is a non-full-duplex subframe set. A subframe in the full-duplex subframe set is a subframe in which the network device receives data in this type of subframe and simultaneously sends downlink data in a same frequency band of the subframe, and a subframe in the non-full-duplex subframe set is a subframe in which the network device receives data in this type of subframe and does not simultaneously send downlink data in a same frequency band of the subframe.

In step 302, the user equipment sends data in the subframe by using an uplink transmit power on which the transmit power compensation has been performed. It should be noted that the data includes data such as service information, control signaling, or a reference signal that is carried on a physical uplink shared channel (for example, a PUSCH), a physical uplink control channel (for example, a PUCCH), or a sounding reference signal (for example, an SRS) channel, or any type of information that is carried on another uplink physical channel. This is not limited in this application.

The embodiments of this application are further described below with reference to FIG. 4.

Figure 4:
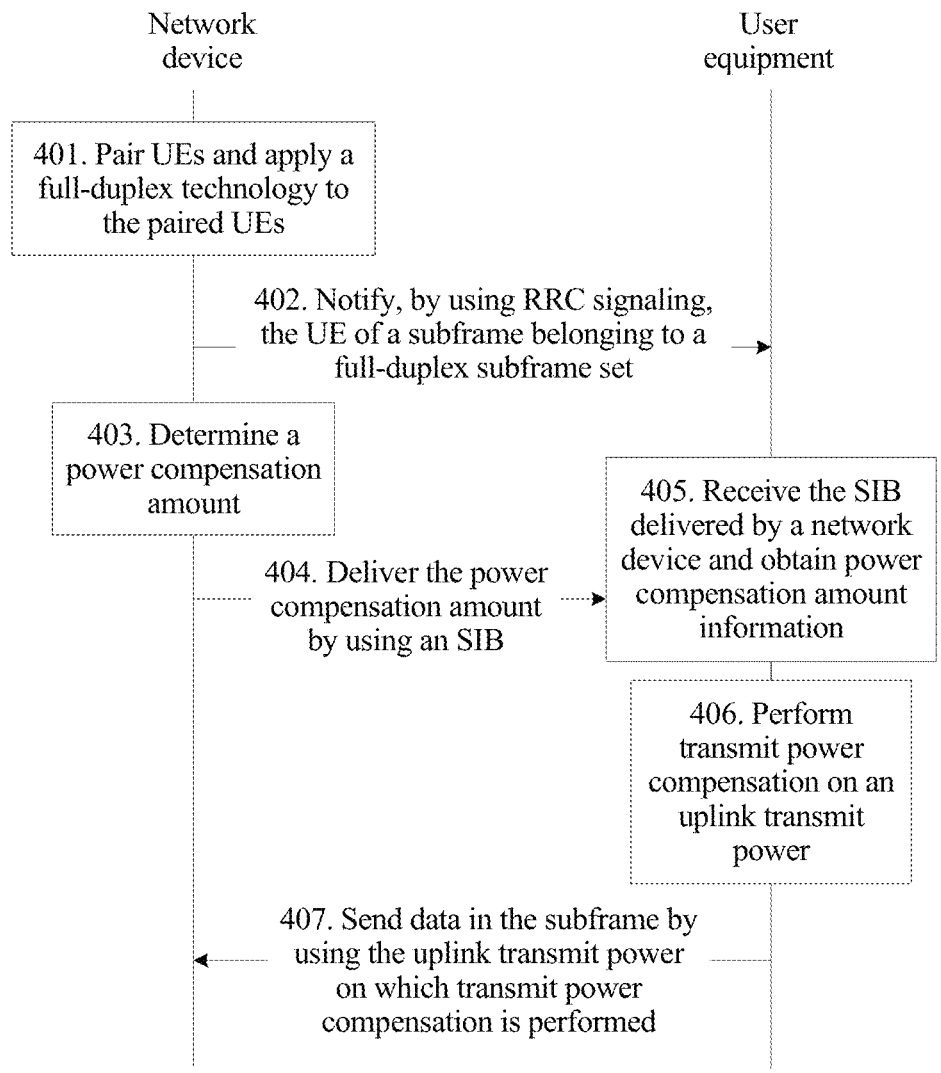
FIG. 4 is a schematic flowchart of another transmit power control method according to an embodiment of this application.

FIG. 4 is a schematic flowchart of another power control method according to an embodiment of this application.

In step 401, a network device pairs UEs and applies a full-duplex technology to the paired UEs.

In an example, UE may measure an interference degree between UEs based on an interference sounding signal transferred between the UEs and reports the interference degree to the network device. The network device pairs UEs having relatively small mutual interference based on mutual interference degrees between UEs, and uses the full-duplex technology for the paired UEs. An LTE TDD system is used as an example. An eNB pairs UE 1 and UE 2 that have relatively small mutual interference. The UE 1 uses subframe configuration 0, and the UE 2 uses subframe configuration 5. As shown in Table 1, if the UE 1 performs uplink transmission and the UE 2 performs downlink transmission in subframes 3, 4, 6, 7, 8, and 9, the eNB needs to use full-duplex transmission in the subframes 3, 4, 6, 7, 8, and 9 (a full-duplex subframe set). Transmission directions of the UE 1 and the UE 2 are the same in remaining subframes (a non-full-duplex subframe set), and the eNB does not use the full-duplex technology. A subframe in the full-duplex subframe set is a subframe in which the network device receives data in this type of subframe and simultaneously sends downlink data in a same frequency band of the subframe, and a subframe in the non-full-duplex subframe set is a subframe in which the network device receives data in this type of subframe and does not simultaneously send downlink data in a same frequency band of the subframe.

TABLE 1

Example of subframe configuration used for paired UEs in an LTE TDD system

| Subframe configuration index | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In step 402, the network device notifies, by using radio resource control (RRC) signaling, the UE of a subframe belonging to a full-duplex subframe set.

In an example, the network device sends, by using the RRC signaling, a UE-level bitmap (bitmap) that indicates a location of the subframe in the full-duplex subframe set. For example, 0001101111 (1 indicates a full-duplex subframe, and 0 indicates a non-full-duplex subframe) indicates that in one radio frame, subframes 3, 4, 6, 7, 8, and 9 are subframes in the full-duplex subframe set, and the other subframes are subframes in the non-full-duplex subframe set.

In step 403, the network device determines a power compensation amount used for calculating an uplink transmit power.

In an example, the network device selects the power compensation amount used for calculating an uplink transmit power from a power compensation amount set. For example, the network device may select, based on a self-interference cancellation capability of the network device from the power compensation amount set, the power compensation amount used for calculating an uplink transmit power, or may randomly select the power compensation amount from the power compensation amount set. The power compensation amount set is defined, so that more choices of power compensation amounts may be provided for network devices having different self-interference cancellation capabilities, different power compensation amounts may be selected by the network device for different physical channels or in different interference scenarios, and a cell-level message used for sending power compensation amount information may be simplified.

In an example, the power compensation amount used for calculating an uplink transmit power includes a power compensation amount of a transmit power of a physical uplink shared channel (PUSCH), a power compensation amount of a transmit power of a physical uplink control channel (PUCCH), and a power compensation amount of a transmit power of an sounding reference signal (SRS). After the full-duplex technology is introduced, the power compensation amount of the uplink transmit power may be applied to an uplink physical channel such as the PUSCH, the PUCCH, or the SRS, so that an uplink transmit power of the subframe in the full-duplex subframe set is increased, to ensure smoothness of a signal-to-noise ratio of an uplink subframe on the channel and further ensure uplink subframe received quality. It may be understood that the embodiment of the solution provided by this application may further be applied to another uplink physical channel, and is not limited to the channel types mentioned above. In an example, the network device determines one first power compensation amount. The one first power compensation amount is used for performing power compensation on a transmit power of a subframe in a first subframe set of one or more different physical channels in the PUSCH, the PUCCH, and the SRS. When the one first power compensation amount is used for transmit power compensation of a plurality of different physical channels, first power compensation amounts of the plurality of different physical channels are equal.

In another example, the network device separately determines a first power compensation amount for different physical channels based on a self-interference cancellation capability of the network device on the different physical channels.

In an example, a second power compensation amount of a transmit power of the PUSCH, a second power compensation amount of a transmit power of the PUCCH, and a second power compensation amount of a transmit power of the SRS are all zero.

In another example, the network device determines a second power compensation amount for different physical channels according to a specific requirement. For example, the network device may randomly select a second power compensation amount for different physical channels from the power compensation amount set. During a selection process, it needs to ensure that a second power compensation amount of a physical channel is less than a first power compensation amount of the physical channel. Alternatively, a second power compensation amount for one or more physical channels may be determined as zero.

In a specific example, the network device determines, based on the self-interference cancellation capability of the network device from the power compensation amount set, a specific power compensation amount as a first power compensation amount for the PUSCH, the PUCCH, and the SRS, and the first power compensation amount is used to compensate for the uplink transmit power of the subframe in the full-duplex subframe set on the foregoing channels. For example, the power compensation amount set is {1, 2, 3, 5} dB, and the network device selects 1 dB as the first power compensation amount for the foregoing uplink physical channels. Second power compensation amounts of the foregoing uplink physical channels are all zero, to be specific, no compensation is performed on an uplink transmit power of the subframe in the non-full-duplex subframe set on the PUSCH, the PUCCH, and the SRS.

In another specific example, the network device determines, based on the self-interference cancellation capability of the network device on different uplink physical channels from the power compensation amount set, three specific power compensation amounts as first power compensation amounts of the PUSCH, the PUCCH, and the SRS, and the first power compensation amounts are used to compensate for the uplink transmit power of the subframe in the full-duplex subframe set on the foregoing channels. For example, the power compensation amount set is {1, 2, 3, 5} dB. The network device selects 1 dB as a first power compensation amount of the PUSCH, selects 2 dB as a first power compensation amount of the PUCCH, and selects 5 dB as a first power compensation amount of the SRS. Second power compensation amounts of the foregoing uplink physical channels are all zero, to be specific, no compensation is performed on the uplink transmit power of the subframe in the non-full-duplex subframe set on the PUSCH, the PUCCH, and the SRS.

In another specific example, the network device determines, based on the self-interference cancellation capability of the network device from the power compensation amount set, a specific power compensation amount as a first power compensation amount for the PUSCH, the PUCCH, and the SRS, and the first power compensation amount is used to compensate for the uplink transmit power of the subframe in the full-duplex subframe set on the foregoing channels. For example, the power compensation amount set is {1, 2, 3, 5} dB, and the network device selects 3 dB as the first power compensation amount for the foregoing uplink physical channels. The network device determines, from the power compensation amount set, a specific power compensation amount as a second power compensation amount for the PUSCH, the PUCCH, and the SRS, and the second power compensation amount is used to compensate for the uplink transmit power of the subframe of the non-full-duplex subframe set on the foregoing channels. For example, the power compensation amount set is {1, 2, 3, 5} dB, and the network device selects 1 dB as the second power compensation amount for the foregoing uplink physical channels. It should be noted that, because the subframe in the full-duplex subframe set is affected by self-interference, and the subframe in the non-full-duplex subframe set is not affected by self-interference, a first power compensation amount of a physical channel is greater than a second power compensation amount of the physical channel. This may ensure smoothness of a received signal-to-noise ratio of an uplink subframe and further ensure uplink subframe received quality.

In still another specific example, the network device determines, based on the self-interference cancellation capability of the network device on different uplink physical channels from the power compensation amount set, three specific power compensation amounts as first power compensation amounts of the PUSCH, the PUCCH, and the SRS, and the first power compensation amounts are used to compensate for the uplink transmit power of the subframe in the full-duplex subframe set on the foregoing channels. For example, the power compensation amount set is {1, 2, 3, 5} dB. The network device selects 1 dB as a first power compensation amount of the PUSCH, selects 2 dB as a first power compensation amount of the PUCCH, and selects 5 dB as a first power compensation amount of the SRS. The network device determines three specific power compensation amounts as second power compensation amounts of the PUSCH, the PUCCH, and the SRS, and the second power compensation amounts are used to compensate for the uplink transmit power of the subframe of the non-full-duplex subframe set on the foregoing channels. For example, the power compensation amount set is {1, 2, 3, 5} dB. The network device chooses not to perform power compensation on the subframe in the non-full-duplex subframe set of the PUSCH, in other words, a second power compensation amount of the PUSCH is zero, selects 1 dB from the power compensation amount set as a second power compensation amount of the PUCCH, and selects 3 dB from the power compensation amount set as a second power compensation amount of the SRS.

In step 404, the network device delivers the power compensation amount by using a system information block SIB.

In an example, the first power compensation amount is configured by using a cell-level parameter, to be specific, the SIB includes first power compensation amount information.

In an example, the second power compensation amount is also configured by using the cell-level parameter, to be specific, the SIB may further include second power compensation amount information.

In another example, the second power compensation amount is zero, to be specific, no power compensation may be performed on a transmit power of a subframe in a second subframe set. In this case, the SIB may include only the first power compensation amount information, or may include the first power compensation amount information and the second power compensation amount information.

In an example, the power compensation amount information used for calculating an uplink transmit power includes at least one piece of power compensation amount information used for calculating a transmit power of a physical uplink shared channel PUSCH, power compensation amount information of a transmit power used for calculating a transmit power of a physical uplink control channel PUCCH, and power compensation amount information used for calculating a transmit power of a sounding reference signal SRS. It may be understood that the embodiment of the solution provided by this application may further be applied to another uplink physical channel, and is not limited to the channel types mentioned above.

In an example, the SIB includes one piece of first power compensation amount information, and the one piece of first power compensation amount information indicates one or more first power compensation amounts in a first power compensation amount of a transmit power of a PUSCH, a first power compensation amount of a transmit power of a PUCCH, and a first power compensation amount of a transmit power of an SRS.

In another example, the SIB includes three pieces of first power compensation amount information, and the three pieces of first power compensation amount information respectively indicate a first power compensation amount of a transmit power of the PUSCH, a first power compensation amount of a transmit power of the PUCCH, and a first power compensation amount of a transmit power of the SRS.

In still another example, the SIB includes two pieces of first power compensation amount information, and the two pieces of first power compensation amount information respectively indicate any two first power compensation amounts in a first power compensation amount of a transmit power of the PUSCH, a first power compensation amount of a transmit power of the PUCCH, and a first power compensation amount of a transmit power of the SRS. The network device notifies the UE of physical channel types corresponding to the any two first power compensation amounts. For example, the network device may notify the UE of performing power compensation only on a transmit power of the PUSCH and a transmit power of the PUCCH in the subframe in the first subframe set. The two pieces of first power compensation amount information included in the SIB are used to indicate first power compensation amounts of the PUSCH and the PUCCH. It may be understood that, for the two pieces of first power compensation amount information included in the SIB, one may be used to indicate first power compensation amounts of any two of the foregoing three physical channels, and the other is used to indicate a first power compensation amount of a remaining physical channel. The network device may notify the UE of a specific correspondence.

In an example, the SIB includes one piece of second power compensation amount information, and the one piece of second power compensation amount information indicates one or more second power compensation amounts in a second power compensation amount of a transmit power of the PUSCH, a second power compensation amount of a transmit power of the PUCCH, and a second power compensation amount of a transmit power of the SRS.

In another example, the SIB includes three pieces of second power compensation amount information, and the three pieces of second power compensation amount information respectively indicate a second power compensation amount of a transmit power of the PUSCH, a second power compensation amount of a transmit power of the PUCCH, and a second power compensation amount of a transmit power of the SRS. It may be understood that, when a second power compensation amount of one or more physical channels is zero, the SIB may not include second power compensation amount information of the one or more physical channels.

In still another example, the SIB includes two pieces of second power compensation amount information, and the two pieces of second power compensation amount information respectively indicate any two second power compensation amounts in a second power compensation amount of a transmit power of the PUSCH, a second power compensation amount of a transmit power of the PUCCH, and a second power compensation amount of a transmit power of the SRS. The network device notifies the UE of physical channel types corresponding to the any two second power compensation amounts. For example, the network device may notify the UE of performing power compensation only on a transmit power of the PUSCH and a transmit power of the PUCCH in the subframe in the second subframe set. The two pieces of second power compensation amount information included in the SIB are used to indicate second power compensation amounts of the PUSCH and the PUCCH. It may be understood that, for the two pieces of second power compensation amount information included in the SIB, one may be used to indicate second power compensation amounts of any two of the foregoing three physical channels, and the other is used to indicate a second power compensation amount of a remaining physical channel. The network device may notify the UE of a specific correspondence.

In a specific example, the first power compensation amount is configured by using a cell-level parameter. For example, a new SIB may be defined and the SIB includes the cell-level parameter used for configuring the first power compensation amount, or the cell-level parameter used for configuring the first power compensation amount may be added to the existing SIB. Table 2 shows a specific possible manner of designing the foregoing cell-level parameter used for configuring the first power compensation amount. In an example shown in Table 2, the cell-level parameter includes two bits, and the two bits are used to indicate a maximum of four types of a value of the first power compensation amount. It may be understood that a bit length or a design manner of the cell-level parameter may be in another form according to a specific requirement. This is not limited in this application. The network device delivers the power compensation amount to all UEs in a cell by using the SIB, and a quantity of signaling does not increase as a quantity of UEs in the cell increases. Therefore, a transmit power of a subframe in a full-duplex subframe set is increased, and uplink subframe received quality is ensured without causing excessively large signaling overheads.

TABLE 2

Example of a cell-level parameter used for configuring a first power compensation amount

| Value of the cell-level parameter | Value of the first power compensation amount (dB) |
|---|---|
| 00 | 1 |
| 01 | 2 |
| 10 | 3 |
| 11 | 5 |

In an example, the second power compensation amount is zero. To be specific, no power compensation may be performed on a transmit power of a subframe in a non-full-duplex subframe set, and an uplink transmit power may be directly calculated according to the power control method in the prior art. For example, in an LTE system, power control may be performed with reference to the uplink power control method specified in 3GPP TS 36.213. In this case, the SIB may include first power compensation amount information and second power compensation amount information, or may include only first power compensation amount information.

In another example, both the first power compensation amount and the second power compensation amount are configured by using a cell-level parameter, and the first power compensation amount is greater than the second power compensation amount. In this case, the SIB includes a cell-level parameter used for configuring the first power compensation amount and a cell-level parameter used for configuring the second power compensation amount. For a specific design manner of the cell-level parameter used for configuring the first power compensation amount and of the cell-level parameter used for configuring the second power compensation amount, refer to the foregoing example description of the cell-level parameter used for configuring the first power compensation amount. Details are not described again.

Similarly, the power compensation amount set {1, 2, 3, 5} dB is used as an example, and with reference to the design example of the cell-level parameter in Table 2, Table 3 shows a specific example of an SIB message including power compensation amount information. In this example, first power compensation amounts of a PUSCH, a PUCCH, and an SRS are all 1 dB, and second power compensation amounts are all zero. Table 4 shows another specific example of an SIB message including power compensation amount information. In this example, first power compensation amounts of a PUSCH, a PUCCH, and an SRS are respectively 1 dB, 2 dB, and 5 dB, and second power compensation amounts are zero. Table 5 shows still another specific example of an SIB message including power compensation amount information. In this example, first power compensation amounts of a PUSCH, a PUCCH, and an SRS are all 3 dB, and second power compensation amounts are all 1 dB. Table 6 shows yet another specific example of an SIB message including power compensation amount information. In this example, first power compensation amounts of a PUSCH, a PUCCH, and an SRS are respectively 1 dB, 2 dB, and 5 dB, and second power compensation amounts are zero, 1 dB, and 3 dB, and the SIB message does not include second power compensation amount information of the PUSCH. It should be noted that examples of the SIB messages in Table 3 to Table 6 show only examples of an information element related to the power compensation amount. In a specific design, the SIB may further include another information element, or another design may be performed for the information element related to the power compensation amount according to a requirement. This is not limited in this application.

TABLE 3

A specific example of an SIB message including power compensation amount information

| First power compensation amount | 00 |
|---|---|

TABLE 4

Another specific example of an SIB message including power compensation amount information

| First power compensation amount of a PUSCH | 00 |
|---|---|
| First power compensation amount of a PUCCH | 01 |
| First power compensation amount of an SRS | 11 |

TABLE 5

Still another specific example of an SIB message including power compensation amount information

| First power compensation amount | 10 |
|---|---|
| Second power compensation amount | 00 |

TABLE 6

Yet another specific example of an SIB message including power compensation amount information

| First power compensation amount of a PUSCH | 00 |
|---|---|
| First power compensation amount of a PUCCH | 01 |
| First power compensation amount of an SRS | 11 |
| Second power compensation amount of the PUCCH | 00 |
| Second power compensation amount of the SRS | 10 |

In step 405, the user equipment receives the SIB delivered by the network device, and parses power compensation amount information included in the SIB.

In step 406, the user equipment calculates a transmit power of an uplink physical channel by using a power compensation amount configured by the network device.

In an example, when the user equipment calculates a transmit power of an uplink physical channel, a formula is met:

$$P(i) = \min \begin{cases} P_{max,c}(i), \\ P_{ori,c}(i) + \Delta_{FD,c}(i) \end{cases}$$

$$\Delta_{FD,c}(i) = \begin{cases} \text{First power compensation amount, } i \in \text{First subframe set} \\ \text{Second power compensation amount, } i \in \text{Second subframe set} \end{cases} \text{[dBm]},$$

where $P(i)$ is a transmit power that is of the uplink physical channel in an $i^{th}$ subframe and that is calculated by the user equipment, $P_{max,c}(i)$ is a maximum transmit power of the user equipment on the uplink physical channel in the $i^{th}$ subframe of a serving cell c of the user equipment, and $P_{ori,c}(i)$ is a transmit power that is of the uplink physical channel in the $i^{th}$ subframe of the serving cell c of the user equipment and that is calculated by the user equipment according to a power control method configured by the network device. The power control method configured by the network device may vary according to different communications systems. For example, in an LTE system, power control may be performed with reference to the uplink power control method specified in 3GPP TS 36.213. $\Delta_{FD,c}(i)$ is a first power compensation amount or a second power compensation amount when the transmit power of the uplink physical channel is calculated. When the $i^{th}$ subframe belongs to the full-duplex subframe set, $\Delta_{FD,c}(i)$ is the first power compensation amount of the uplink physical channel; when the $i^{th}$ subframe belongs to the non-full-duplex subframe set, $\Delta_{FD,c}(i)$ is the second power compensation amount of the uplink physical channel.

An LTE system is used as an example. In a specific example, the user equipment does not simultaneously perform transmission on a physical uplink control channel PUCCH in a subframe in which transmission on a physical uplink shared channel PUSCH is performed, and a PUSCH transmit power in a subframe in a full-duplex subframe set and a PUSCH transmit power in a subframe in a non-full-duplex subframe set meet a formula:

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) + \Delta_{PUSCH,FD,c}(i) \end{cases} \text{[dBm]},$$

where $P_{PUSCH,c}(i)$ is a PUSCH transmit power of user equipment in an $i^{th}$ subframe in a serving cell c of the user equipment; $P_{CMAX,c}(i)$ is a maximum transmit power of the user equipment in the $i^{th}$ subframe in the serving cell c of the user equipment; $M_{PUSCH,c}(i)$ is a quantity of PUSCH resource blocks (RB) of the user equipment in the $i^{th}$ subframe in the serving cell c of the user equipment; $P_{O\_PUSCH,c}(j)$, j=0, 1, 2 is an expected received power of the network device in the cell c; $PL_c$ is a downlink path loss estimation value of the user equipment in the serving cell c of the user equipment; $\alpha_c(j)$, j=0, 1, 2 is a path loss compensation factor of the cell c; $\Delta_{TF,c}(i)$ is a power offset that is relative to a reference modulation and coding scheme (MCS) when different MCSs are used by the user equipment in the $i^{th}$ subframe in the serving cell c of the user equipment; $f_c(i)$ is an adjustment value of the PUSCH transmit power of the user equipment; and $\Delta_{PUSCH,FD,c}(i)$ is a first power compensation amount or a second power compensation amount when the PUSCH transmit power is calculated, where when the $i^{th}$ subframe belongs to the full-duplex subframe set, $\Delta_{PUSCH,FD,c}(i)$ is the first power compensation amount, or when the $i^{th}$ subframe belongs to the non-full-duplex subframe set, $\Delta_{PUSCH,FD,c}(i)$ is the second power compensation amount.

An LTE system is used as an example. In a specific example, the user equipment simultaneously performs transmission on a physical uplink control channel PUCCH in a subframe in which transmission on a physical uplink shared channel PUSCH is performed, and a PUSCH transmit power in a subframe in a full-duplex subframe set and a PUSCH transmit power in a subframe in a non-full-duplex subframe set meet a formula:

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) + \Delta_{PUSCH,FD,c}(i) \end{Bmatrix} [dBm],$$

where $P_{PUSCH,c}(i)$ is a PUSCH transmit power of user equipment in an $i^{th}$ subframe in a serving cell c of the user equipment; $\hat{P}_{CMAX,c}(i)$ is a linear value of a maximum transmit power of the user equipment in the $i^{th}$ subframe in the serving cell c of the user equipment; $\hat{P}_{PUCCH}(i)$ is a linear value of a PUCCH transmit power of the user equipment in the $i^{th}$ subframe in the serving cell c of the user equipment; $M_{PUSCH,c}(i)$ is a quantity of PUSCH resource blocks (RB) of the user equipment in the subframe in the serving cell c of the user equipment; $P_{O\_PUSCH,c}(j)$, j=0, 1, 2 is an expected received power of the network device in the cell c; $PL_c$ is a downlink path loss estimation value of the user equipment in the serving cell c of the user equipment; $\alpha_c(j)$, j=0, 1, 2 is a path loss compensation factor of the cell c; $\Delta_{FD,c}(i)$ is a power offset that is relative to a reference modulation and coding scheme (MCS) when different MCSs are used by the user equipment in the $i^{th}$ subframe in the serving cell c of the user equipment; $f_c(i)$ is an adjustment value of the PUSCH transmit power of the user equipment; and $\Delta_{PUSCH,FD,c}(i)$ is a first power compensation amount or a second power compensation amount when the PUSCH transmit power is calculated, where when the $i^{th}$ subframe belongs to the full-duplex subframe set, $\Delta_{PUSCH,FD,c}(i)$ is the first power compensation amount, or when the $i^{th}$ subframe belongs to the non-full-duplex subframe set, $\Delta_{PUSCH,FD,c}(i)$ is the second power compensation amount.

An LTE system is used as an example. In a specific example, a transmit power of a physical uplink control channel PUCCH in a subframe in a full-duplex subframe set and a PUCCH transmit power in a subframe in a non-full-duplex subframe set meet a formula:

$$P_{PUCCH}(i) = \min \begin{Bmatrix} P_{CMAX,c}(i), \\ P_{O\_PUCCH} + PL_c + h(n_{CQI}, n_{HARQ}, n_{SR}) + \\ \Delta_{F\_PUCCH}(F) + \Delta_{TxD}(F') + g(i) + \Delta_{PUCCH,FD,c}(i) \end{Bmatrix} [dBm],$$

where $P_{PUCCH,c}$ is a PUCCH transmit power of the user equipment in an $i^{th}$ subframe in a serving cell c of the user equipment; $P_{CMAX,c}(i)$ is a maximum transmit power of the user equipment in the $i^{th}$ subframe in the serving cell c of the user equipment; $P_{O\_PUCCH}$ is a power reference value that is set by the network device; $PL_c$ is a downlink path loss estimation value of the user equipment in the serving cell c of the user equipment; $h(n_{CQI}, n_{HARQ}, n_{SR})$ is a PUCCH transmit power offset that is set based on a channel quality indicator (CQI) and a quantity of bits of an answer message that are carried on the PUCCH; $\Delta_{F\_PUCCH}$ (F) is an offset configured by the network device based on a PUCCH format; $\Delta_{TxD}(F')$ is a power offset determined based on a modulation and coding scheme and a data type of the user equipment, where F and F' indicate PUCCH formats on different antenna ports; g(i) is a current PUCCH power control adjustment value of the user equipment; and $\Delta_{PUCCH,FD,c}(i)$ is a first power compensation amount or a second power compensation amount when the PUCCH transmit power is calculated, where when the $i^{th}$ subframe belongs to the full-duplex subframe set, $\Delta_{PUCCH,FD,c}(i)$ is the first power compensation amount, or when the $i^{th}$ subframe belongs to the non-full-duplex subframe set, $\Delta_{PUCCH,FD,c}(i)$ is the second power compensation amount.

An LTE system is used as an example. In a specific example, a transmit power of a sounding reference signal SRS in a subframe in a full-duplex subframe set and an SRS transmit power in a subframe in a non-full-duplex subframe set meet a formula:

$$P_{SRS,c}(i) = \min \begin{Bmatrix} P_{CMAX,c}(i), \\ P_{SRS\_OFFSET,c}(m) + 10\log_{10}(M_{SRS,c}) + \\ P_{O\_PUSCH,c}(j) + \alpha_c(j) \cdot PL_c + f_c(i) + \Delta_{SRS,FD,c}(i) \end{Bmatrix} [dBm],$$

where $P_{SRS,c}(i)$ is an SRS transmit power of the user equipment in an $i^{th}$ subframe in a serving cell c of the user equipment; $P_{CMAX,c}(i)$ is a maximum transmit power of the user equipment in the $i^{th}$ subframe in the serving cell c of the user equipment; $P_{SRS\_OFFSET,c}$ (m), m=0, 1 is a power offset configured by a higher layer of the network device; $M_{SRS,c}$ is a quantity of SRS resource blocks (RB) of the user equipment in the $i^{th}$ subframe in the serving cell c of the user equipment; $P_{O\_PUSCH,c}$ (j), j=0, 1, 2 is an expected received power of the network device in the cell c; $PL_c$ is a downlink path loss estimation value of the user equipment in the serving cell c of the user equipment; $\alpha_c(j)$, j=0, 1, 2 is a path loss compensation factor of the cell c; $f_c(i)$ is an adjustment value of a PUSCH transmit power of the user equipment; and $\Delta_{SRS,FD,c}(i)$ is a first power compensation amount or a second power compensation amount when the SRS transmit power is calculated, where when the $i^{th}$ subframe belongs to the full-duplex subframe set, $\Delta_{SRS,FD,c}(i)$ is the first power compensation amount, or when the $i^{th}$ subframe belongs to the non-full-duplex subframe set, $\Delta_{SRS,FD,c}(i)$ is the second power compensation amount.

An LTE system is used as an example. In a specific example, the user equipment does not simultaneously perform transmission on a physical uplink control channel PUCCH in a subframe in which transmission on a physical uplink shared channel PUSCH is performed, power headroom reported by the user equipment meets a formula:

$$PH_{type1,c}(i) = \\ P_{CMAX,c}(i) - \begin{Bmatrix} 10\log_{10}(M_{PUSCH,c}(i)) + P_{O\_PUSCH,c}(j) + \\ \alpha_c(j) \cdot PL_c + \Delta_{TF,c}(i) + f_c(i) + \Delta_{PUSCH,FD,c}(i) \end{Bmatrix} [dB],$$

or meets a formula:

$$PH_{type2}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i)+\Delta_{PUSCH,FD,c}(i))/10}+\\10^{(P_{0\_PUCCH}+PL_c+g(i))/10}\end{array}\right)[dB],$$

where $PH_{type1,c}(i)$ and $PH_{type2}(i)$ are power headroom reported by the user equipment according to different definition rules.

An LTE system is used as an example. In a specific example, the user equipment simultaneously performs transmission on a physical uplink control channel PUCCH in a subframe in which transmission on a physical uplink shared channel PUSCH is performed, power headroom reported by the user equipment meets a formula:

$$PH_{type2}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i)+\Delta_{PUSCH,FD,c}(i))/10}+\\10^{(P_{0\_PUCCH}+PL_c+h(n_{CQI},n_{HARQ},n_{SR})+\Delta_{F\_PUCCH}(F)+\Delta_{T\times D}(F')+g(i)+\Delta_{PUCCH,FD,c}(i))/10}\end{array}\right)[dB],$$

or meets a formula:

$$PH_{type1,c}(i) = \tilde{P}_{CMAX,c}(i) - \left\{\begin{array}{l}10\log_{10}(M_{PUSCH,c}(i))+P_{O\_PUSCH,c}(j)+\\\alpha_c(j)\cdot PL_c+\Delta_{TF,c}(i)+f_c(i)+\Delta_{PUSCH,FD,c}(i)\end{array}\right\}[dB],$$

where $PH_{type1,c}(i)$ and $PH_{type,2}(i)$ are power headroom reported by the user equipment according to different definition rules, and $\tilde{P}_{CMAX,c}(i)$ is a maximum transmit power of the user equipment if only transmission on the PUSCH is performed in an $i^{th}$ subframe.

An LTE system is used as an example. In a specific example, the user equipment does not perform transmission on a physical uplink shared channel PUSCH in a subframe in which transmission on a physical uplink control channel PUCCH is performed, power headroom reported by the user equipment meets a formula:

$$PH_{type2}(i) = P_{CMAX,c}(i) - 10\log_{10}\left(\begin{array}{l}10^{(P_{O\_PUSCH,c}(1)+\alpha_c(1)\cdot PL_c+f_c(i))/10}+\\10^{(P_{0\_PUCCH}+PL_c+h(n_{CQI},n_{HARQ},n_{SR})+\Delta_{F\_PUCCH}(F)+\Delta_{T\times D}(F')+g(i)+\Delta_{PUCCH,FD,c}(i))/10}\end{array}\right)[dB],$$

or meets a formula:

$$PH_{type1,c}(i) = \tilde{P}_{CMAX,c}(i) - \{P_{O\_PUSCH,c}(1)+\alpha_c(1)\cdot PL_c+f_c(i)\}[dB], \text{ where}$$

$PH_{type1,c}(i)$ and $PH_{type2}(i)$ are power headroom reported by the user equipment according to different definition rules, and $\tilde{P}_{CMAX,c}(i)$ is a maximum transmit power of the user equipment if only transmission on the PUSCH is performed in an $i^{th}$ subframe.

In step 407, the user equipment sends data in the subframe by using an uplink transmit power on which transmit power compensation is performed.

It may be understood that, to implement the foregoing functions, the network device or the user equipment includes corresponding hardware structures and/or software modules for performing the functions. A person skilled in the art should be easily aware that units and algorithm steps in the examples described with reference to the embodiments provided in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 5:
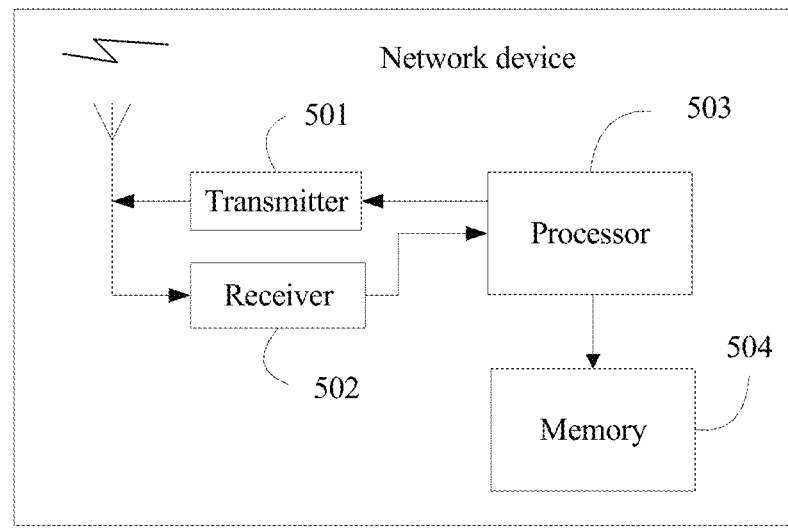
FIG. 5 is a schematic structural diagram of a network device according to an embodiment of this application.

FIG. 5 is a possible schematic structural diagram of the network device in the foregoing embodiments.

In an example, a structure of the network device includes a receiver. In another example, the structure of the network device further includes a transmitter. In still another example, the structure of the network device further includes a processor. In yet another example, the structure of the network device may further include an interface unit, configured to support communication between the network device and another network device, for example, communication between the network device and a core network node. In the examples corresponding to FIG. 5, the structure of the network device in this application includes a transmitter 501, a receiver 502, a processor 503, and a memory 504.

The transmitter 501 and the receiver 502 are configured to: support the network device in receiving/transmitting information from/to the UE in the foregoing embodiment, and support the UE in performing radio communication with other UE. The processor 503 performs various functions for communicating with the UE. In a downlink, service data and a signaling message are processed by the processor 503, and are adjusted by the transmitter 501 to generate a downlink signal, and the downlink signal is transmitted to the UE by using an antenna. In an uplink, an uplink signal from the UE is received by an antenna, adjusted by the receiver 502, and further processed by the processor 503, so as to restore service data and signaling information that are sent by the UE. The processor 503 further performs a processing process in FIG. 3 and FIG. 4 that relates to a network device and/or another process of a technology described in this application. The memory 504 is configured to store program code and data of the network device.

It may be understood that FIG. 5 shows only a simplified design of the network device. In actual application, the network device may include any quantity of transmitters, receivers, processors, controllers, memories, and the like, and all network devices that can implement this application fall within the protection scope of this application.

Figure 6:
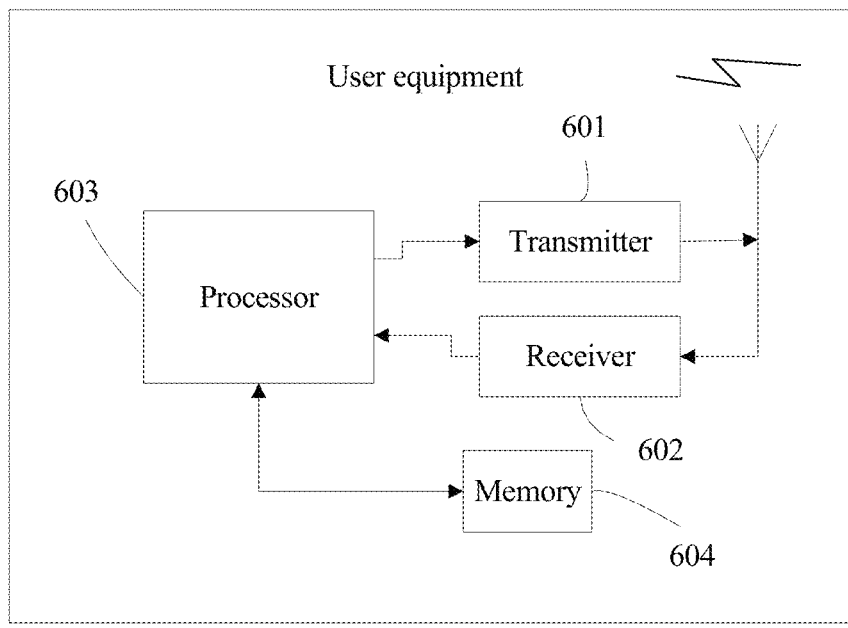
FIG. 6 is a schematic structural diagram of user equipment according to an embodiment of this application.

FIG. 6 shows a simplified schematic diagram of a possible design structure of the UE in the foregoing embodiments.

In an example, a structure of the user equipment includes a processor and a transmitter. In another example, the user equipment further includes a receiver.

In the examples corresponding to FIG. 6, the structure of the user equipment in this application includes a transmitter 601, a receiver 602, a processor 603, and a memory 604.

In an uplink, the transmitter 601 adjusts (for example, through analog conversion, filtering, amplification, and up-conversion) an output sample and generates an uplink signal. The uplink signal is transmitted to the network device in the foregoing embodiments by an antenna. In a downlink, an antenna receives a downlink signal transmitted by the network device in the foregoing embodiments. The receiver 602 adjusts (for example, through filtering, amplification, down-conversion, and digitization) a signal received from the antenna and provides an input sample. The processor 603 performs processing (for example, formatting, encoding, and interleaving) on service data and a signaling message. These units perform processing according to a radio access technology (such as an access technology in LTE or another evolved system) used by a radio access network. The processor 603 is further configured to perform control management on an action of the UE, and configured to perform processing that is performed by UE in the foregoing embodiments, for example, configured to: control the UE to receive downlink information and/or perform, based on the received downlink information, another process of a technology described in this application. For example, the processor 603 is configured to support the UE in performing a processing process in FIG. 3 and FIG. 4 that relates to the UE and/or another process of the technology described in this application. The memory 604 is configured to store program code and data of the UE.

The methods or algorithm steps described with reference to the content disclosed in this application may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, alternatively, the storage medium may be a part of the processor. The processor and the storage medium may be located in an ASIC. In addition, the ASIC may be located in the user equipment. Certainly, the processor and the storage medium may exist in the user equipment as discrete components.

A person of skill in the art should be aware that in one or more of the foregoing examples, the functions described in this application may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification or improvement made based on the technical solutions of this application shall fall within the protection scope of this application.

What is claimed is:

1. A transmit power control method, comprising:
    performing, by user equipment, transmit power compensation on a first subframe in a first subframe set using a first cell-level power compensation amount;
    sending, by the user equipment, data in the first subframe using an uplink transmit power on which the transmit power compensation has been performed; and
    performing, by the user equipment, transmit power compensation on a second subframe in a second subframe set using a second cell-level power compensation amount, wherein the first cell-level power compensation amount is greater than the second cell-level power compensation amount, wherein the first subframe set is a full-duplex subframe set and the second subframe set is a non-full-duplex subframe set, wherein a subframe in the full-duplex subframe set is a subframe in which a network device receives data in this type of subframe and simultaneously sends downlink data in a same frequency band of the subframe, and wherein a subframe in the non-full-duplex subframe set is a subframe in which the network device receives data in this type of subframe and does not simultaneously send downlink data in a same frequency band of the subframe.

2. The method according to claim 1, wherein before the performing, by user equipment, transmit power compensation on a first subframe in a first subframe set using a first cell-level power compensation amount, the method further comprises:
    receiving, by the user equipment, a system information block (SIB) sent by a network device and comprising first power compensation amount information.

3. The method according to claim 2, wherein the SIB comprises one piece of first power compensation amount information, and wherein the one piece of first power compensation amount information indicates at least one of a first power compensation amount of a transmit power of a physical uplink shared channel, a first power compensation amount of a transmit power of a physical uplink control channel, or a first power compensation amount of a transmit power of a sounding reference signal.

4. The method according to claim 2, wherein the SIB comprises three pieces of first power compensation amount information, and wherein the three pieces of first power compensation amount information respectively indicate a first power compensation amount of a transmit power of a physical uplink shared channel, a first power compensation amount of a transmit power of a physical uplink control channel, and a first power compensation amount of a transmit power of a sounding reference signal.

5. User equipment, comprising:
    at least one processor, the at least one processor configured to perform transmit power compensation on a first subframe in a first subframe set using a first cell-level power compensation amount;

a transmitter, the transmitter configured to send data in the first subframe using an uplink transmit power on which the transmit power compensation has been performed; and wherein the at least one processor is further configured to perform transmit power compensation on a second subframe in a second subframe set using a second cell-level power compensation amount, wherein the first cell-level power compensation amount is greater than the second cell-level power compensation amount, wherein the first subframe set is a full-duplex subframe set and the second subframe set is a non-full-duplex subframe set, wherein a subframe in the full-duplex subframe set is a subframe in which a network device receives data in this type of subframe and simultaneously sends downlink data in a same frequency band of the subframe, and wherein a subframe in the non-full-duplex subframe set is a subframe in which the network device receives data in this type of subframe and does not simultaneously send downlink data in a same frequency band of the subframe.

6. The user equipment according to claim 5, further comprising:

a receiver, the receiver configured to receive a system information block (SIB) sent by a network device and comprising first power compensation amount information.

7. A non-transitory computer-readable storage medium comprising instructions which, when executed by a computer, cause the computer to carry out the steps of:

performing transmit power compensation on a first subframe in a first subframe set using a first cell-level power compensation amount;

sending data in the first subframe using an uplink transmit power on which the transmit power compensation has been performed; and performing transmit power compensation on a second subframe in a second subframe set using a second cell-level power compensation amount, wherein the first cell-level power compensation amount is greater than the second cell-level power compensation amount, wherein the first subframe set is a full-duplex subframe set and the second subframe set is a non-full-duplex subframe set, wherein a subframe in the full-duplex subframe set is a subframe in which a network device receives data in this type of subframe and simultaneously sends downlink data in a same frequency band of the subframe, and wherein a subframe in the non-full-duplex subframe set is a subframe in which the network device receives data in this type of subframe and does not simultaneously send downlink data in a same frequency band of the subframe.

8. The non-transitory computer-readable storage medium according to claim 7, wherein before the performing transmit power compensation on a first subframe in a first subframe set using a first cell-level power compensation amount, the instructions further cause the computer to carry out the steps of:

receiving a system information block (SIB) that is sent by a network device and that comprises first power compensation amount information.

9. The non-transitory computer-readable storage medium according to claim 8, wherein the SIB comprises one piece of first power compensation amount information, and wherein the one piece of first power compensation amount information indicates at least one of a first power compensation amount of a transmit power of a physical uplink shared channel, a first power compensation amount of a transmit power of a physical uplink control channel, or a first power compensation amount of a transmit power of a sounding reference signal.

10. The non-transitory computer-readable storage medium according to claim 8, wherein the SIB comprises three pieces of first power compensation amount information, and wherein the three pieces of first power compensation amount information respectively indicate a first power compensation amount of a transmit power of a physical uplink shared channel, a first power compensation amount of a transmit power of a physical uplink control channel, and a first power compensation amount of a transmit power of a sounding reference signal.

* * * * *